W. McMILLEN.
Hemp Brake.
No. 2,796.
Patented Sept. 30, 1842.
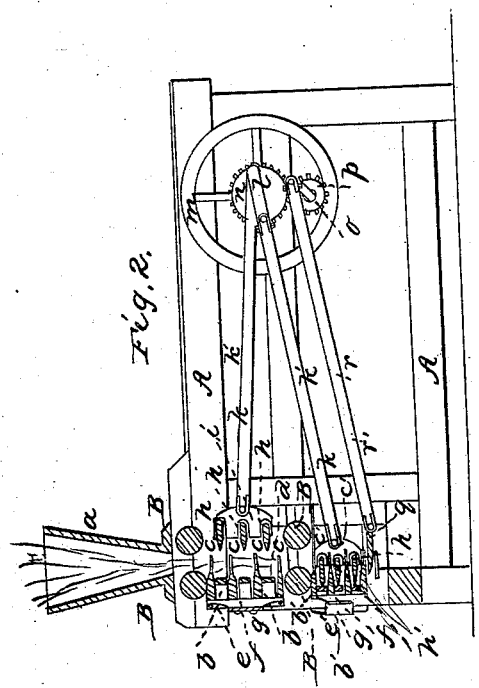
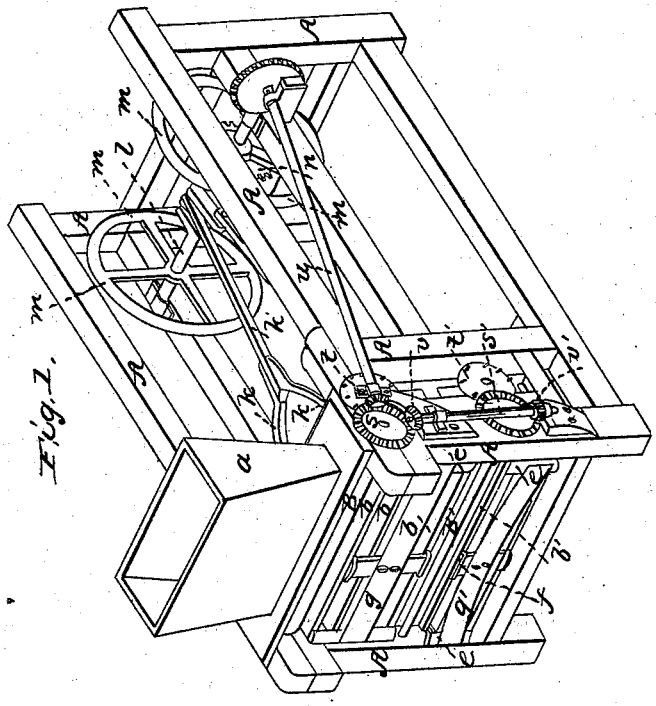

UNITED STATES PATENT OFFICE.

WILLIAM McMILLEN, OF RIPLEY, OHIO.

IMPROVEMENT IN MACHINES FOR BREAKING AND CLEANING FLAX AND HEMP.

Specification forming part of Letters Patent No. 2,796, dated September 30, 1842.

*To all whom it may concern:*

Be it known that I, WILLIAM MCMILLEN, of Ripley, in the county of Brown and State of Ohio, have invented a new and useful Improvement for Breaking and Cleaning Hemp and Flax; and I do hereby declare that the following is a full, clear, and exact description thereof, reference being had to the accompanying drawings, making a part of this specification—

Figure 1 being an isometrical view; Fig. 2, a longitudinal section.

The nature of my invention consists in breaking and cleaning hemp in one machine without handling it after it enters the machine till it is cleaned, the hemp entering at a hopper on the top and passing down through brakes placed underneath, and after being cleaned coming out at the bottom ready for market.

In constructing this machine a suitable frame, A, is made to hold the machinery. At the forward end two rollers, B, are placed parallel to each other, their gudgeons resting on the top plates, the inner one being movable to and from the other by a screw, similar to rollers in many machines now in common use. Over the rollers a hopper, a, is placed, for directing the hemp which is put into it down between the rollers. Below the rollers in the front part of the machine stationary swords b are affixed, from the inner edge of each of which an iron rod, c, projects and runs parallel to and in front of the swords their whole length at a sufficient distance to admit the hemp to pass between the swords and wires. The spaces between the swords are filled with spring-pieces d, having projections on each end, which are joined to a vertical slat, e, that connects them all together outside and in front of the swords. At the center of the swords staples are affixed, into which upright pieces f are made to slip, so that they can be removed at pleasure. To these pieces springs g are screwed, the ends of which press against the slats e.

Below the swords above described there are two rollers, B', similar to those marked B, above described, under which swords b', spring-bars d', rods e', and springs g' are arranged in the same relative position as those above described, only the swords are placed much nearer each other, to break finer. Opposite the swords above named are movable heads i i', which slide forward and back horizontally in grooves in the frame, in which blades h are affixed that slide in between the stationary swords b. From the heads i arms k extend and join a connecting-rod, k', similar to the hounds and pole of a carriage. The connecting-rods extend back and are attached to wrists of cranks which stand opposite to each other on the crank-shaft l, on which are two balance-wheels, m, and a cog-wheel, n, that gears into a pinion, o, of half its size, on a shaft, p, below, on which is a crank that moves the "scutcher" q by means of the connecting-rod r. The scutcher is a single blade sliding under the lower stationary sword with twice the rapidity of the movable heads i. This is for the purpose of cleaning the hemp.

The machine is put in motion by any power applied to the shaft i. The rollers B B are turned by bevel-gearing s, which connects them, by means of the shaft u, running back to the shaft l outside the frame, with that shaft. The rollers, being geared together by the cog-wheels s and t, turn in opposite directions. The upper rollers, B, are connected with the lower ones, B', by a vertical shaft, w, having pinions v and v' on its upper and lower ends, which mesh into the bevel-wheels s and s' on the rollers. As the hemp passes down through the hopper between the first pair of rollers to the brake the first head, i, strikes it and forces it between the first stationary swords, driving back the spring-bars d and breaking the hemp. As soon as the head recedes the spring-bars push back the hemp to a straight position and clear it from the stationary swords, so that it can pass downward. The rods c prevent the hemp from following the movable blades and going too far from a straight line in the other direction. The hemp, after being broken by the first or coarse brake, passes down through the second pair of rollers, and is again broken by a second and finer brake, and, after being acted on by the scutcher, passes out of the machine entirely cleaned and ready for packing, without any handling after it is put into the hopper till it comes out below.

What I claim as my invention, and desire to secure by Letters Patent, is—

1. Constructing the machine with two brakes and two pairs of feed-rollers, so that the hemp passing down vertically shall be fed from one brake to the other without handling, and in combination therewith the scutcher $q$, combined and arranged as above described.

2. The spring-bars $d$, in combination with the stationary swords, in the manner and for the purpose herein set forth.

3. The rods $c$, attached to the stationary swords, for preventing the hemp from following the movable blades, constructed and combined for the purpose above specified.

WM. McMILLEN.

Witnesses:
　LEMUEL LINDSEY,
　THOS. MITCHELL.